(12) United States Patent
Harvey, Jr. et al.

(10) Patent No.: US 7,587,296 B2
(45) Date of Patent: Sep. 8, 2009

(54) ADAPTIVE MULTIVARIATE FAULT DETECTION

(75) Inventors: Jerry Lynn Harvey, Jr., Plano, TX (US); Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/800,471

(22) Filed: May 4, 2007

(65) Prior Publication Data

US 2008/0015814 A1 Jan. 17, 2008

Related U.S. Application Data

(60) Provisional application No. 60/746,649, filed on May 7, 2006, provisional application No. 60/746,647, filed on May 7, 2006.

(51) Int. Cl.
*G06F 11/00* (2006.01)

(52) U.S. Cl. .................. 702/179; 702/185; 714/25

(58) Field of Classification Search .......... 702/179, 702/183, 185; 714/25–26, 45–47, 724
See application file for complete search history.

(56) References Cited

U.S. PATENT DOCUMENTS

| | | | |
|---|---|---|---|
| 5,442,562 A | | 8/1995 | Hopkins et al. |
| 6,678,569 B2 | | 1/2004 | Bunkofske et al. |
| 6,868,342 B2 | | 3/2005 | Mutter et al. |
| 6,907,545 B2 | * | 6/2005 | Ramadei et al. ............ 714/25 |
| 6,954,883 B1 | * | 10/2005 | Coss et al. ................. 714/47 |
| 7,062,411 B2 | | 6/2006 | Hopkins et al. |
| 7,072,794 B2 | | 7/2006 | Wittkowski |
| 7,079,677 B2 | | 7/2006 | Tai et al. |
| 7,089,154 B2 | * | 8/2006 | Rasmussen et al. ......... 702/183 |
| 7,151,976 B2 | | 12/2006 | Lin |
| 7,413,546 B2 | | 8/2008 | Agutter et al. |
| 2002/0143472 A1 | | 10/2002 | Mutter et al. |
| 2003/0109951 A1 | | 6/2003 | Hsiung et al. |
| 2003/0225466 A1 | | 12/2003 | Yulevitch et al. |
| 2004/0002842 A1 | | 1/2004 | Woessner |
| 2004/0024543 A1 | | 2/2004 | Zhang et al. |
| 2004/0110310 A1 | | 6/2004 | Sun et al. |
| 2004/0210850 A1 | | 10/2004 | Bermudez et al. |
| 2004/0254762 A1 | | 12/2004 | Hopkins et al. |

(Continued)

OTHER PUBLICATIONS

Case Study: "Automated Fault Detection and Diagnostic Software", New Buildings Institute, http://www.archenergy.com/pier-fdd/market_connection/proj7_Deliverables/FD-DAlgorithmsCaseStudyFinal.pdf. Apr. 17, 2007, 4 pages.

(Continued)

*Primary Examiner*—Drew A Dunn
*Assistant Examiner*—Hien X Vo
(74) *Attorney, Agent, or Firm*—Blakely, Sokoloff Taylor & Zafman LLP

(57) ABSTRACT

A method and apparatus for detecting faults. A set of data samples is received, the set of data samples including multiple process variables. One or more multivariate statistical models are adapted, wherein adapting includes applying a change to at least one univariate statistic of the one or more multivariate statistical models if the change is greater than a threshold value. The one or more multivariate statistical models are used to analyze subsequent process data to detect faults.

22 Claims, 5 Drawing Sheets

U.S. PATENT DOCUMENTS

| | | |
|---|---|---|
| 2005/0010117 A1 | 1/2005 | Agutter et al. |
| 2005/0060103 A1 | 3/2005 | Chamness |
| 2006/0111804 A1 | 5/2006 | Lin |
| 2006/0184264 A1 | 8/2006 | Willis et al. |
| 2007/0021859 A1 | 1/2007 | Lev-Ami et al. |
| 2007/0038418 A1 | 2/2007 | Ahn et al. |

OTHER PUBLICATIONS

Chen, Kuang-Han et al., "Multivariate Statistical Process Control and Signature Analysis Using Eigenfactor Detection Methods", 2001, pp. 1-21.

Gallagher, Neal B. et al., "Development and Benchmarking of Multivariate Statistical Process Control Tools for a Semiconductor Etch Process: Improving Robustness Through Model Updating" *Eigenvector-Research Inc.*, Manson, WA, USA, 1997, 6 pages.

Applied Materials Software Office Action for U.S. Appl. No. 11/800,461 (P004) mailed Jul. 3, 2008.

Applied Materials Software Office Action for U.S. Appl. No. 11/800,471 (P005) mailed Aug. 5, 2008.

Li, W., et al. "Recursive PCA for Adaptive Process Monitoring", J. Process Control, vol. 10, p. 471-486, 2000.

PCT International Search Report and Written Opinion for International Application No. PCT/US07/11106, mailed Jul. 14, 2008, 9 pages.

PCT International Search Report and Written Opinion for International Application No. PCT/US07/11142, mailed Jul. 28, 2008, 11 pages.

Spitzlsperger, Gerhard et al. "Fault Detection for a VIA Etch Process Using Adaptive Multivariate Methods" ISSM Tokyo 2004, p. 528-533.

PCT International Search Report and Written Opinion for International Application No. PCT/US08/05667, mailed Aug. 18, 2008, 10 pages.

Applied Materials, Inc. Notice of Allowance for U.S. Appl. No. 11/800,461, mailed Mar. 3, 2009, (8090P004).

Applied Materials, Inc. Office Action for U.S. Appl. No. 11/800,471, mailed Feb. 3, 2009, (8090P005).

Applied Materials, Inc. Office Action for U.S. Appl. No. 11/800,462, mailed Apr. 2, 2009, (8090P026).

Applied Materials, Inc. Office Action for U.S. Appl. No. 11/985,603, mailed Apr. 8, 2009, (8090P026C).

* cited by examiner

ADAPTIVE MULTIVARIATE FAULT DETECTION

RELATED APPLICATIONS

This application claims priority to provisional application No. 60/746,649, filed on May 7, 2006, now expired, and to provisional application No. 60/746,647, filed on May 7, 2006, now expired.

TECHNICAL FIELD

Embodiments of the present invention relate to fault detection, and more specifically to fault detection using an adaptable multivariate fault detection model.

BACKGROUND

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of "faults." A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

During process monitoring, a fault is detected when one or more of the statistics of recent process data deviate from a statistical model by an amount great enough to cause a model metric to exceed a respective confidence threshold. A model metric is a scalar number whose value represents a magnitude of deviation between the statistical characteristics of process data collected during actual process monitoring and the statistical characteristics predicted by the model. Each model metric is a unique mathematical method of estimating this deviation. Conventional model metrics include Squared Prediction Error (commonly referred to as SPE, Qres, or Q), and Hotelling's T2 (T2).

Each model metric has a respective confidence threshold, also referred to as a confidence limit or control limit, whose value represents an acceptable upper limit of the model metric. If a model metric exceeds its respective confidence threshold during process monitoring, it can be inferred that the process data has aberrant statistics because of a fault.

An obstacle to accurate fault detection is the fact that manufacturing processes commonly drift over time, even in the absence of any problems. For example, the operating conditions within a semiconductor process chamber typically drift between successive cleanings of the chamber and between successive replacements of consumable chamber components. Conventional statistical process monitoring methods for fault detection suffer shortcomings in distinguishing normal drift from a fault.

Specifically, some fault detection methods employ a static model, which assumes that process conditions remain constant over the life of a tool. Such a model does not distinguish between expected changes over time and unexpected deviations caused by a fault. To prevent process drift from triggering numerous false alarms, the control limit must be set wide enough to accommodate drift. Consequently, the model may fail to detect subtle faults.

Gallagher, Neal B. et al., "Development and benchmarking of multivariate statistical process control tools for a semiconductor etch process: improving robustness through model updating", ADCHEM 1997, Banff, Canada; and Li, Weihua et al., "Recursive PCA for adaptive process monitoring", J. Process Control, vol. 10, pp. 471-486 (2000) each describe methods of responding to drifts in the process conditions by periodically adapting a model to drifts in process data. The Gallagher publication describes adaptation of mean and covariance statistics. Gallagher attempts to distinguish between faults and normal drifts by identifying an occurrence of a fault if either a Q or T2 metric for a model exceeds a confidence limit. The Li publication describes adaptation of mean, covariance, principal component matrix, and number of principal components in a principal component analysis (PCA) model. Neither of the methods of adapting as suggested by Gallagher and Li detects faults that occur gradually.

Spitzlsperger, Gerhard et al., "Fault detection for a via etch process using adaptive multivariate methods", ISSM, Tokyo, Japan (2004) discloses the use of human expert knowledge to adapt only univariate mean and scaling coefficients that are expected to drift. However, by adapting only univariate means and scaling coefficients, this method fails to provide adaptation of the covariances between variables within a model.

Each of the conventional adaptation methods described above is susceptible to cumulative computational rounding errors, which are caused by the periodic adaptations. This results in the models having inaccurate statistical values that can cause both false alarms and a failure to detect actual faults.

BRIEF DESCRIPTION OF THE DRAWINGS

The present invention is illustrated by way of example, and not by way of limitation, in the figures of the accompanying drawings and in which.

DETAILED DESCRIPTION

Figure 1:
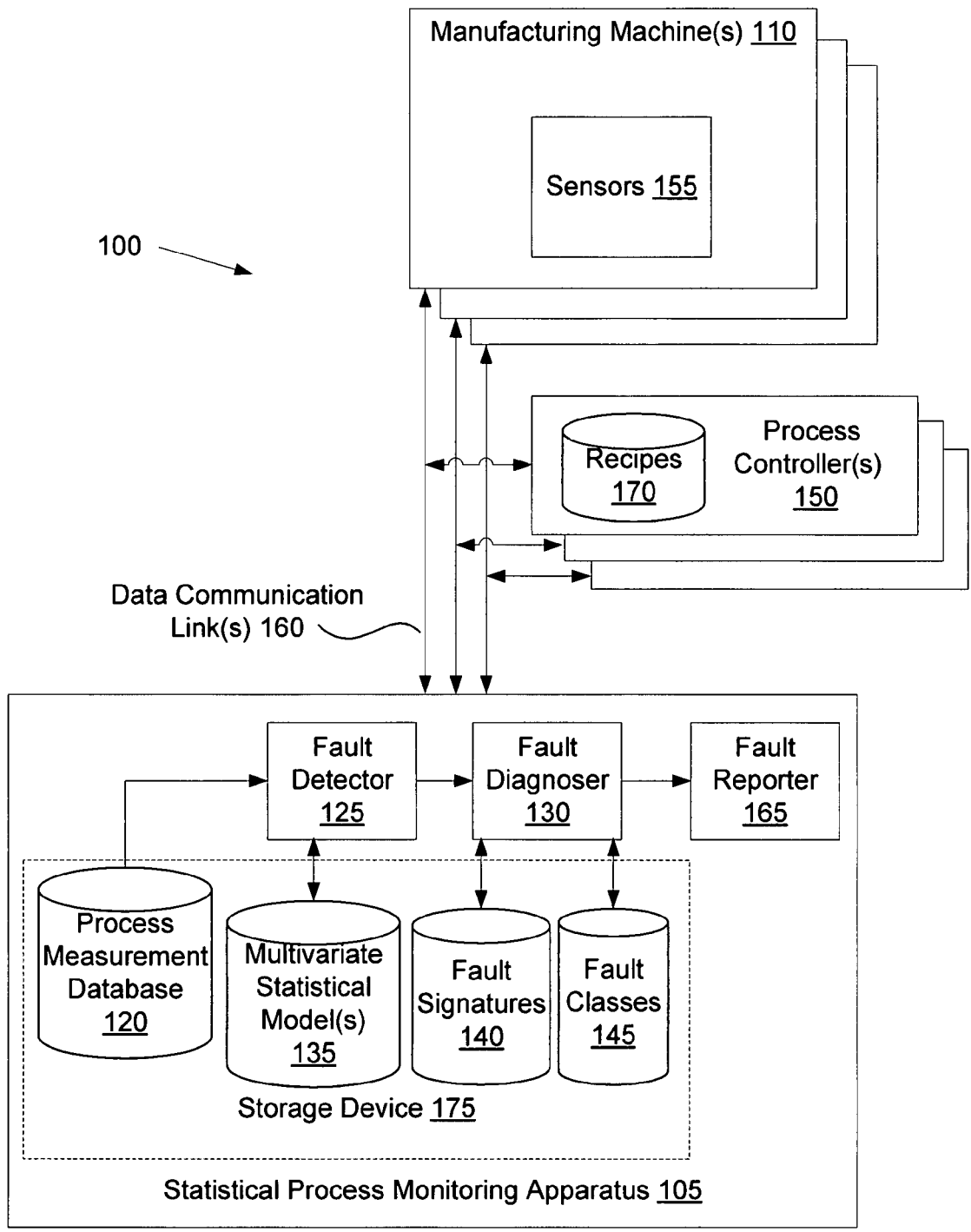
FIG. 1 illustrates one embodiment of a statistical process monitoring system.

Described herein is a method and apparatus for detecting faults. In one embodiment, process data is received that includes a plurality of process variables. Examples of process variables include temperature, pressure, silane flow, etc. One or more multivariate statistical models are adapted according to the process data. Adapting may include applying a change to at least one univariate statistic of the multivariate statistical models if such a change would not exceed a threshold value. In one embodiment, adaptation is performed at predetermined intervals based on a measured drift of one or more of the process variables. The adapted multivariate statistical models may then be used to analyze subsequent process data for the detection of faults.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

FIG. 1 illustrates one embodiment of a statistical process monitoring system 100. The statistical process monitoring system 100 includes a statistical process monitoring apparatus 105 coupled with one or more manufacturing machines 110 and one or more process controllers 150 by data communication links 160. The statistical process monitoring system 100 may include all manufacturing machines 110 in a factory (e.g., a fabrication facility). Alternatively, the statistical process monitoring system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors for monitoring processes run on the manufacturing machines 110. One type of sensor that may be included in the manufacturing machine is a temperature sensor. Examples of other sensors include pressure sensors, flow rate sensors, or any other sensors that monitor physical conditions of a manufacturing process or physical properties of a work piece manufactured by the manufacturing machines 110.

Each manufacturing process that is performed on a manufacturing machine 110 is characterized by various physical conditions and properties measured by the sensors, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a work piece, or when different steps of a process expose the work piece to different process conditions (e.g., pressure, temperature, etc.).

Process controllers 150 control operating parameters of manufacturing machines 110. For example, process controllers may control chamber temperature, vacuum pumps, gas injection systems, etc. of manufacturing machines 110. Process controllers 150 may store one or more process recipes (recipes) 160. Each recipe 160 may define operating parameters of a manufacturing machine 110 at each step of a process. In one embodiment, recipes 160 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring apparatus 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc, may be used.

The statistical process monitoring apparatus 105 may be a single server that analyzes incoming process data from the manufacturing machines 110, sensors 155 and process controllers 150. Alternatively the statistical process monitoring apparatus 105 may include multiple servers and/or computers. The statistical process monitoring apparatus 105 in one embodiment includes a fault detector 125, a fault diagnoser 130 and a fault reporter 150. The statistical process monitoring device 105 may also include a storage device 175. In one embodiment, the statistical process monitoring apparatus 105 is included in one or more of the process controllers 150. Alternatively, the process monitoring apparatus 105 may be a distinct and/or separate apparatus.

The storage device 175 may include a process measurement database 120, one or more multivariate statistical models 135, fault signatures 140 and fault classes 145. In one embodiment, the storage device 175 is a single storage device of a computer or server of the statistical process monitoring apparatus 105. Alternatively, the storage device 175 may be external to the statistical process monitoring apparatus 105. In one embodiment, the storage device 175 includes multiple storage devices, some of which may include redundant copies of data for backup.

Process measurement data (process data) may be stored in process measurement database 120. The stored process data may be used to show drifts and trends for each of the manufacturing machines 110, for processes run on the manufacturing machines 110, etc. In one embodiment, the stored process data is used to generate one or more multivariate statistical models 135, as described below. Once generated, the multivariate statistical models 135 may be stored in storage device 175.

In one embodiment, a training period is used to collect data for the generation of one or more multivariate statistical models. The training period covers a collection of process runs of a specific manufacturing process completed under known and/or controlled conditions on a particular manufacturing machine. Process data gathered from process runs completed during the training period may be used to generate statistics such as mean, variance, covariance matrix, etc. These statistics are used collectively to generate one or more multivariate statistical models, generally for a specific process that runs on a specific machine.

Each multivariate statistical model 135 may include one or more model metrics. Model metrics are scalar values that characterize an amount of deviation between a set of process data and a model. In one embodiment, the model metrics include Squared Prediction Error (commonly referred to as SPE, Qres, or Q) and Hotellings T2. Model metrics may also include combined metrics such as the Combined Multivariate Index (CMI). Each of these metrics corresponds to a different method of estimating the probability that process data being monitored has the same statistics as training data that was used to build the model. The aforesaid statistics and metrics may be calculated in accordance with conventional statistics algorithms.

One or more of the multivariate models may utilize Principal Components Analysis (PCA) to transform an M-dimensional process variable space to an N-dimensional space of mutually orthogonal principal components, where M is the number of process variables, and N is much smaller than M. PCA calculates a set of M eigenvectors and M eigenvalues, where each respective eigenvector transforms process variable data to a respective dimension of the principal component space, and each eigenvalue is proportional to the amount of variance represented by a corresponding eigenvector. To simplify (reduce the dimension of) the principal component space, the N eigenvectors corresponding to the N largest eigenvalues are retained in the model; the other eigenvectors are discarded or ignored. The number N of principal components retained in the model is a parameter of the model that may be user selected. The number of principal components (N) may be chosen based on a tradeoff between a model explaining less of the data variance when using a smaller value of N and the model being over-specified when using a larger value of N.

Once one or more multivariate statistical models have been generated, they may be used by fault detector 125 to monitor processes run on manufacturing machines 110. Fault detector 125 analyzes process data by executing various statistical process monitoring methods, each of which is based on at least one multivariate statistical model. In one embodiment, fault detector 125 receives process measurement data (process data) directly from the manufacturing machines 110, sensors 155 and/or process controllers 150. In another embodiment, fault detector 125 may receive process data from the process measurement database 120. In yet another embodiment, fault detector 125 receives process data from both sources.

To detect faults, fault detector 125 calculates statistics of process data for processes being monitored, and compares the calculated statistics with corresponding statistics of appropriate multivariate statistical models. The statistics may be compared for one model metric, or for multiple model metrics (e.g., T2, SPE, CMI). If one or more of the model metrics exceed a predetermined threshold (referred to as a confidence limit or control limit), a fault may be detected. In one embodiment, each model metric has a threshold value that is user selected. The chosen threshold value may represent a compromise between risk of a false alarm (if the threshold is too low) and risk of failing to detect a fault (if the threshold is too high). Where multiple metrics are calculated, faults may be triggered if any one of the metrics exceeds threshold values. Alternatively, some faults may be indicated only if certain metrics exceed threshold values or only if multiple metrics exceed threshold values.

Once a fault has been identified by the fault detector 125, the fault is analyzed by fault diagnoser 130. Fault diagnoser 130 compares the fault to a collection of fault signatures 140. Each fault signature represents process conditions representative of a specific fault or faults. In one embodiment, fault signatures 140 are ranked lists of process variables that have a greatest statistical contribution to a specific fault or faults. Fault diagnoser 130 may compare each stored fault signature to a ranked list of process variables having greatest contributions for a current fault. When there is a high degree of similarity between one of the fault signatures 140 and the current fault, a match is reported.

Each of the fault signatures 140 is associated with one or more fault classes 145. The fault classes 145 may indicate an actual problem that generated a current fault, or a probable cause of the current fault. For example, if the fault signature indicates that the greatest contributing process variable was silane flow rate, the fault class may indicate that a valve that feeds silane into a chamber has malfunctioned.

Fault reporter 165 generates fault reports indicating which fault class or fault classes 145 correspond to a current fault. The fault reports may be sent to one or more clients (not shown) (e.g., local computers, remote computers, personal digital assistants (PDAs), pagers, cell phones, etc.) that are networked to the statistical process monitoring apparatus 105. Fault reporter 165 may also cause manufacturing machines 110 to be shut down, cause a machine to alarm, or cause other appropriate actions.

Manufacturing processes often drift over time, even in the absence of a fault. For example, the operating conditions within a semiconductor process chamber typically drift between successive cleanings of the chamber and between successive replacements of consumable chamber components. By adapting to process drift, changes in process variables caused by drift are not erroneously interpreted as faults.

Figure 2:
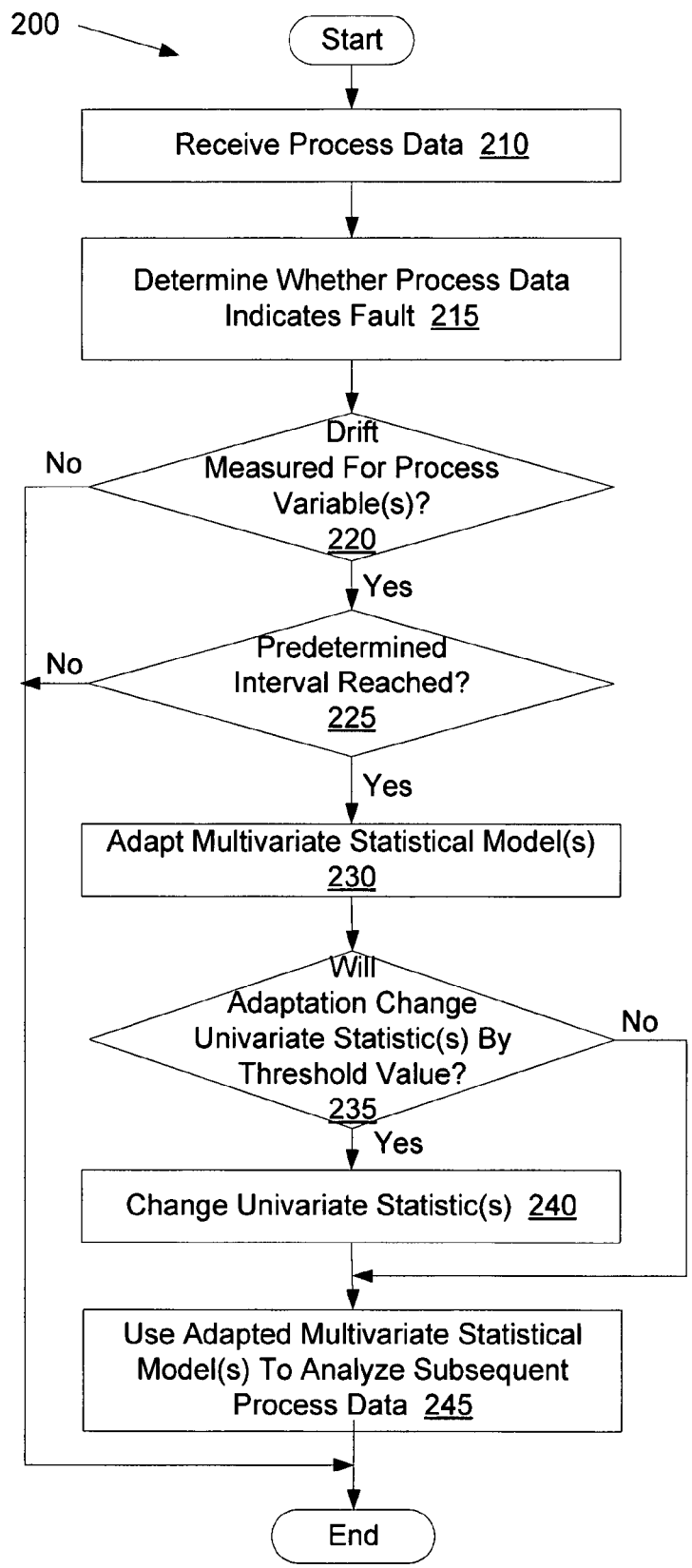
FIG. 2 illustrates a flow diagram of one embodiment for a method of detecting faults by adapting one or more multivariate statistical models.

FIG. 2 illustrates a flow diagram of one embodiment for a method 200 of detecting faults by adapting one or more multivariate statistical models. The method may be performed by processing logic that may comprise hardware (e.g., circuitry, dedicated logic, programmable logic, microcode, etc.), software (such as instructions run on a processing device), or a combination thereof. In one embodiment, method 200 is performed by the statistical process monitoring apparatus 105 of FIG. 1.

Referring to FIG. 2, method 200 begins with processing logic receiving process data (block 210). The process data may be from a process run on a manufacturing machine, and may include multiple process variables. At block 215, the process data is analyzed to determine whether a fault is indicated for one or more multivariate statistical models. In the illustrated embodiment, the process data is analyzed to detect a fault before any adaptation is performed. Alternatively, process data may be analyzed after adaptation is performed. A fault is indicated for one of the multivariate statistical models when process data indicates that a threshold value for one or more metrics (e.g., T2, SPE, CMI, etc.) of the multivariate statistical model has been exceeded.

In one embodiment, two or more multivariate statistical models are employed concurrently for fault detection. A fault may therefore be identified if at least one of the models detects a fault. Reports may also be sent to a user even if no faults are identified, such as if one model detects a fault and another model does not. Alternatively, a fault may not be reported unless at least two models indicate a possible fault.

In one embodiment, two or more multivariate statistical models differ from one another in at least one way. Models may differ, for example, by employing different process variables, by using different numbers of principal components, by employing different methods of fault detection, by using different confidence limits, or by using different amounts of process data to maintain the model. For example, a first model may include all process data for a process, a second model may include all process data generated since a latest preventative maintenance (PM), and a third model may include only the last 1000 wafers. Models may also differ by employing different methods of adapting to drift (e.g., which process variables are adapted, which statistics are adapted, what adaptation thresholds are used, etc.), as explained in more detail below with reference to block 220. In one embodiment, at least one multivariate statistical model does not adapt to drift, and at least one multivariate statistical model does adapt to drift. Multivariate statistical models may also vary in ways not mentioned in the above examples.

Each of the multiple multivariate statistical models may be created simultaneously during a training period, using a single set of training data. Alternatively, different models may employ different training data, or additional training data. This may be desirable, for example, if one model includes more process variables than another, or if a static model needs to incorporate additional data from designed experiments or from a longer training period in order to cover additional operating norms.

Returning to FIG. 2, at block 220, processing logic determines whether drift is measured for one or more process variables. Drift is measured if certain statistics of a process variable (e.g., mean, standard deviation, etc.) have gradually adjusted. If no drift is measured, the method ends. If drift is detected for one or more process variables, the method proceeds to block 225. In an alternative embodiment, the method proceeds to block 225 irregardless of whether drift has been measured.

At block 225, processing logic determines whether a predetermined condition has occurred, hereinafter referred to as the adaptation trigger. In one embodiment, the adaptation trigger includes a specific time interval (e.g., one hour, one day, etc.). When the time interval expires, the adaptation trigger has occurred. Alternatively, the adaptation trigger may include a certain number of process runs, a predetermined number of data samples, etc. Once the certain number of process runs are completed, the predetermined number of data samples are produced, etc., the adaptation trigger may occur. One or more of the adaptation triggers may be combined so that, for example, an adaptation is performed if either a predetermined number of data sets is produced, or a predetermined time interval since a previous adaptation has expired. If the adaptation trigger has not occurred, the method ends. If the adaptation trigger has occurred, the method continues to block 230.

At block 230, one or more of the multivariate statistical models are adapted. Different algorithms may be used to adapt to drift, one of which includes use of an exponentially weighted moving average (EWMA). Other suitable adaptation algorithms include use of a forgetting factor, windowing, and recursive moving average. Other adaptation algorithms may also be used.

In one embodiment, all statistics for each of the process variables are adapted. Alternatively, some process variables may not be adapted and/or some statistics of one or more process variables may not be adapted. In one embodiment, processing logic identifies a first set of one or more process variables whose statistics are expected to drift in normal operation of a manufacturing machine. The first set of process variables may be adapted in the model, while holding all other process variables static. Processing logic may also identify a second set of one or more process variables whose statistics are expected to remain stationary in the absence of a fault. All process variables other than the second set may be adapted in the model, while holding the second set of process variables static. In one embodiment, the first set of process variables and the second set of process variables are used together. This may allow processing logic to detect both gradual faults and sudden faults, and may prevent erroneous adaptation to a gradual fault.

One or more statistics may be adapted for each adapted process variable. Examples of statistics that may be adapted for process variables include mean, variance, covariance, correlation (e.g., of a correlation matrix), principal component eigenvectors and eigenvalues, and number of principal components. In one embodiment, different statistics are adapted for different process variables. Selection of which (if any) statistics to adapt for process variables may be based on user input, or automatic without user input (e.g., based on a selection algorithm). For example, the mean and variance of certain process variables may be expected to drift, while the correlation of these process variables with other process variables may not be expected to drift. Accordingly, the mean and variance of the appropriate process variables may be adapted, while the covariance statistics between these process variables and other process variables remains static. In another example, for certain other process variables, all the statistics may be expected to drift. Accordingly, all statistics of those other process variables may be adapted.

Returning to FIG. 2, at block 235, processing logic determines whether adaptation will change one or more univariate statistics by at least a threshold value, hereinafter referred to as the adaptation threshold. As a multivariate statistical model is adapted, there is a risk that cumulative computational rounding errors will cause erroneous changes to the calculated values of univariate statistics (e.g., mean and variance) that actually have not changed. Such cumulative errors in the univariate statistics can cause disproportionate errors in the calculations of the multivariate statistics (e.g., covariance). To ameliorate such an occurrence, if adaptation would not change one or more univariate statistics by at least the adaptation threshold, the method proceeds to block 245. If one or more univariate statistics would be changed by the adaptation threshold, the method proceeds to block 240.

In one embodiment, the adaptation threshold for each respective univariate statistic is a fixed value. Alternatively, the adaptation threshold of a univariate statistic may be a relative value such as a predetermined fraction of a current value. For example, in one embodiment, the adaptation threshold for each respective univariate statistic is one billionth ($10^{-9}$) of the current value of the respective univariate statistic. One or more univariate statistics may share the same adaptation threshold. Alternatively, some or all of the univariate statistics may have their own adaptation thresholds.

At block 240, those univariate statistics that will change by an amount greater than or equal to the adaptation threshold are changed. Adaptation of univariate statistics that will not change by the adaptation threshold may be deferred until the change does exceed the threshold.

At block 245, the adapted multivariate statistical model or models are used to analyze subsequent process data to detect faults. The method then ends.

In one embodiment, the most recent process data is used to adapt a multivariate statistical model after it is determined that the most recent process data does not deviate from the model sufficiently to indicate a fault. Alternatively, the most recent process data may be used to adapt the model before performing fault detection. In another embodiment, fault detection is performed twice on process data, once before adapting and once after adapting, according to the method described below with reference to FIG. 3.

Figure 3:
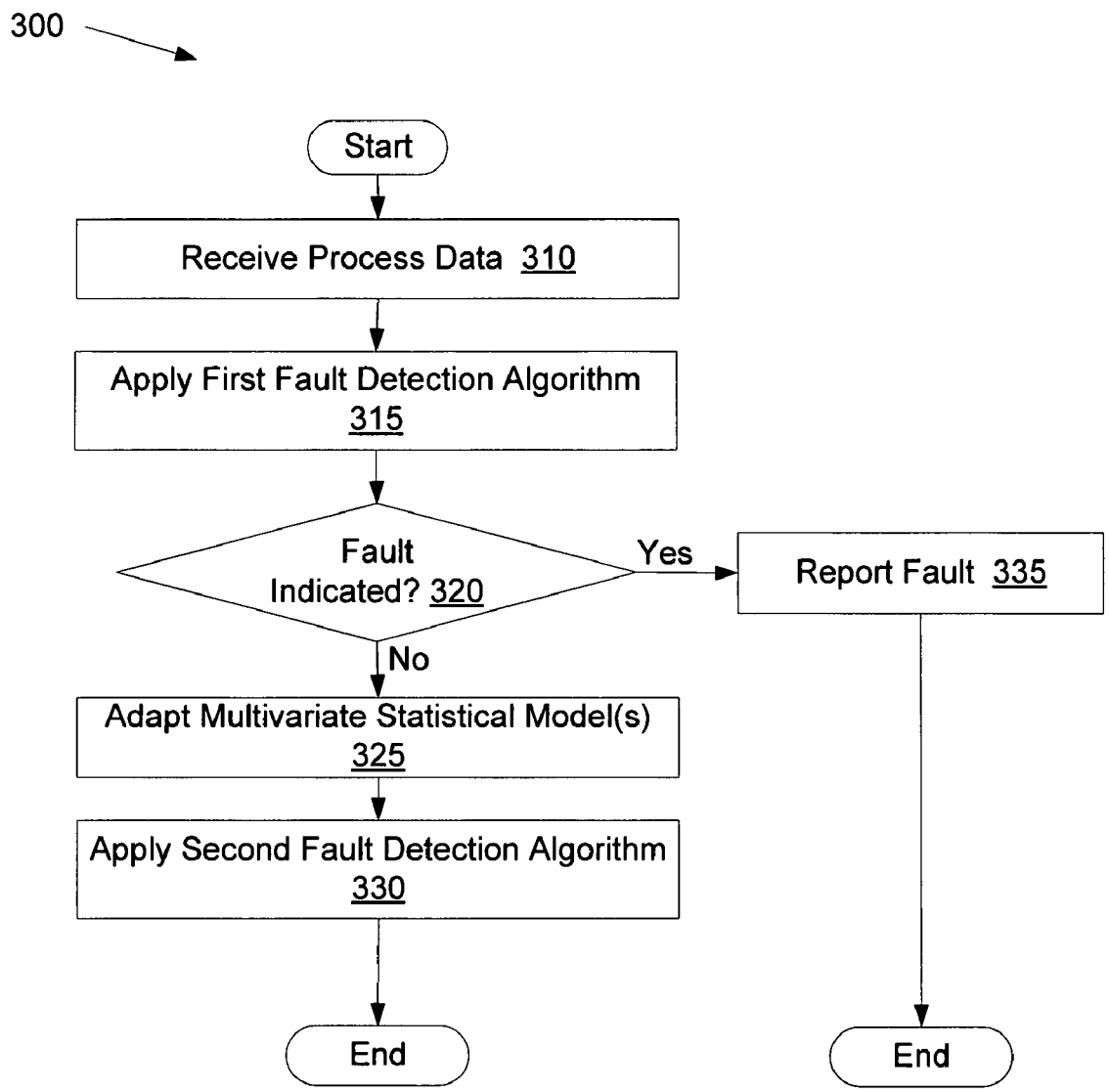
FIG. 3 illustrates a flow diagram of one embodiment for a method of detecting faults.

FIG. 3 illustrates a flow diagram of one embodiment for a method 300 of detecting faults. The method may be performed by processing logic that may comprise hardware (e.g., circuitry, dedicated logic, programmable logic, microcode, etc.), software (such as instructions run on a processing device), or a combination thereof. In one embodiment, method 300 is performed by the statistical process monitoring apparatus 105 of FIG. 1.

Referring to FIG. 3, method 300 begins with processing logic receiving process data (block 310). At block 315 a first fault detection algorithm is applied to the process data. In one embodiment, the first fault detection algorithm uses relatively loose (e.g., insensitive) fault detection thresholds. At block 320, processing logic determines whether a fault is indicated. In one embodiment, if a fault is indicated the method proceeds to block 335, and if no fault is indicated the method proceeds to block 325. In an alternative embodiment, the method proceeds to block 325 whether or not a fault is indicated.

At block 335, a fault is reported. Reporting a fault may include notifying a user by sending a message to a client, sounding an alarm on a manufacturing machine, halting a process, etc. The method then ends.

At block 325, one or more multivariate statistical models are adapted. Subsequently, a second fault detection algorithm is applied (block 330). In one embodiment, the second fault detection algorithm uses the adapted model to determine whether a fault has occurred. In one embodiment, the second fault detection algorithm uses relatively strict (sensitive) fault detection thresholds. The use of two fault detection algorithms may reduce a probability of triggering false alarms and increase a probability of detecting actual faults.

The operating conditions within a semiconductor process chamber typically undergo an abrupt shift after machine repair, corrective maintenance (e.g., replacement or calibration of a component), or preventive maintenance (e.g., cleaning a process chamber), all of which are collectively referred to as machine maintenance. To prevent this abrupt shift from being identified as a fault, it is desirable to "reset" all or portions of the model after machine maintenance.

Figure 4:
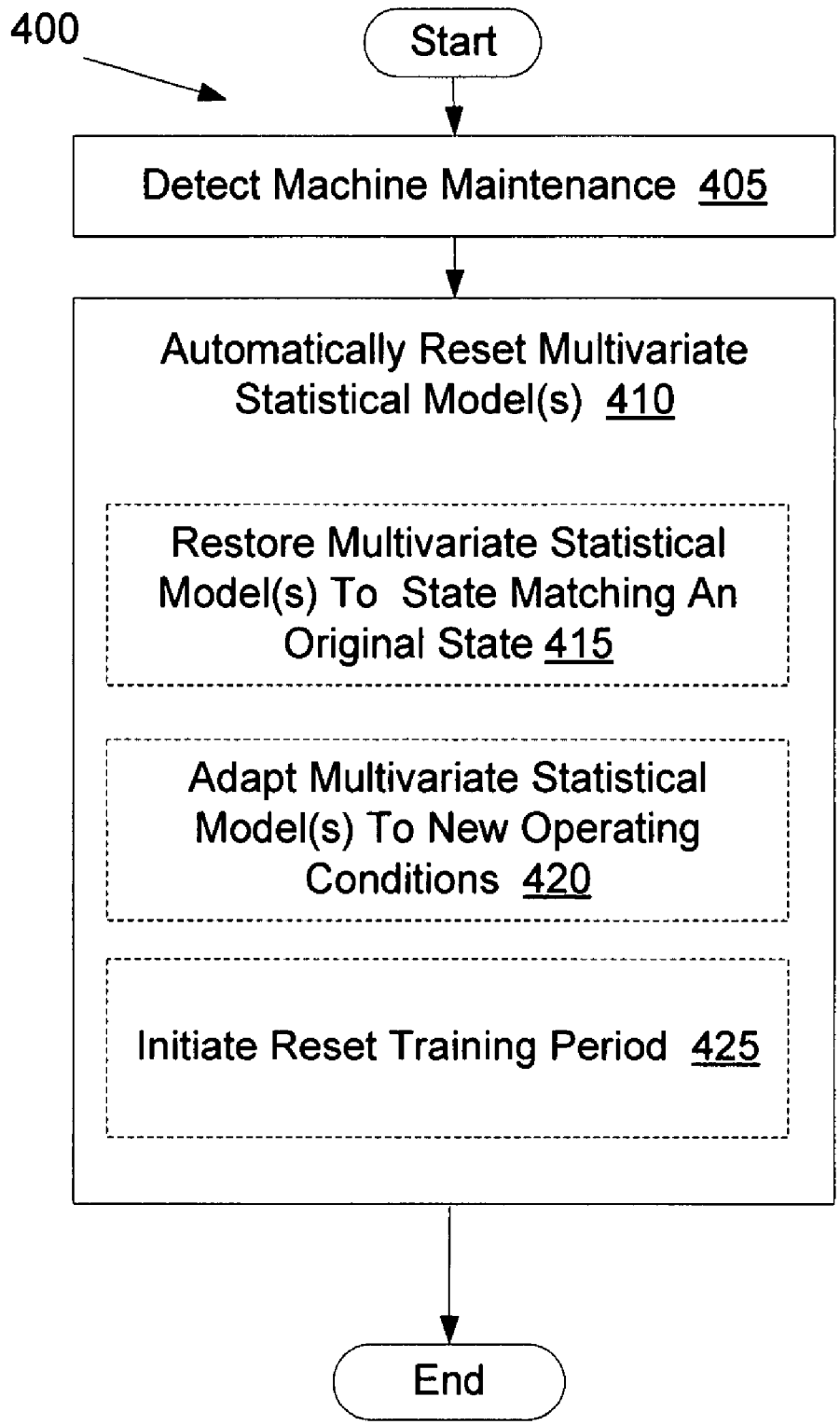
FIG. 4 illustrates a flow diagram of one embodiment for a method of detecting faults by resetting one or more statistical models after machine maintenance.

FIG. 4 illustrates a flow diagram of one embodiment for a method 400 of detecting faults by resetting one or more statistical models after machine maintenance. The method may be performed by processing logic that may comprise hardware (e.g., circuitry, dedicated logic, programmable logic, microcode, etc.), software (such as instructions run on a processing device), or a combination thereof. In one embodiment, method 400 is performed by the statistical process monitoring apparatus 105 of FIG. 1.

Referring to FIG. 4, method 400 begins with detecting machine maintenance (block 405). The machine maintenance may be detected for a specific manufacturing machine or for multiple manufacturing machines. At block 410, one or more multivariate statistical models are automatically reset. A model reset may be automatically initiated when a value of a process variable changes in a manner that implies that machine maintenance has been performed. Examples of such process variable changes include a counter being reset to zero (e.g., to indicate a component replacement), a manufacturing machine being out of service for longer than a predetermined time period, or a change in certain process set-point values. Alternatively, a reset of one or more multivariate statistical model may be manually initiated by a user, such as when a manufacturing machine is restored to operation after machine maintenance.

In one embodiment, the model is reset by restoring to a state matching an original state that was generated upon completion of a training period, and before any adaptation was performed (block 415). In another embodiment, the model is reset by adapting all or portions of the model to new operating conditions (block 420), as described above with reference to FIG. 2. For example, statistics for selected process variables may be adapted to reflect the new operating conditions. In one embodiment, the process variables selected for adaptation include those process variables that are expected to change as a result of a specific type of maintenance actually performed. Alternatively, the process variables selected for adaptation may be those process variables that have the highest fault contributions and/or fault contributions greater than a threshold value. The calculation may be based on error statistics that are produced by applying process data that was generated after the machine maintenance to the model as it existed prior to the machine maintenance. In one embodiment, a number of process variables selected for adaptation is increased iteratively until one or more model error statistics drops below a predetermined threshold.

In one embodiment, resetting the multivariate statistical models includes initiating a reset training period (block 425). Process data from the reset training period may be used to recalculate all or portions of a multivariate statistical model. In one embodiment, the reset training period uses process data from actual processing of product on a manufacturing machine. In one embodiment, multivariate fault detection is disabled during the reset training period. This may prevent the occurrence of numerous false alarms. Alternatively, multivariate fault detection is disabled for some fault classes and/or fault signatures during the reset training period. Thereby, faults that are likely to be false alarms may be suppressed, while actual faults are still monitored. The reset training period is ended once enough process data has been collected to recreate at least one multivariate statistical model.

In one embodiment, the reset training period may be ended, and fault detection resumed, when process data indicates that a new multivariate statistical model has converged to a stable set of statistics. This may occur when certain statistics of the new multivariate statistical model are changed by less than a threshold value by the introduction of new process data. Alternatively, the reset training period may end when a predetermined number of training data samples is produced by the manufacturing machine and incorporated in the new model. In another embodiment, the reset training period may end when one or more model error statistics drops below a predetermined threshold when comparing the new model to process data. In yet another embodiment, the reset training period may end when the frequency with which one or more model error statistics exceeds a predetermined threshold when comparing the new model to the training data drops below a predetermined threshold. In yet another embodiment, the reset training period may end when a frequency with which selected process variables differ from their mean values by more than their standard deviation drops below a predetermined threshold.

In one embodiment, the techniques described above with reference to resetting a multivariate statistical model may be used to apply an existing multivariate statistical model of a first manufacturing machine to a second manufacturing machine. To transfer the multivariate statistical model from the first manufacturing machine to the second manufacturing machine, a copy of the multivariate statistical model may be generated and associated to the second manufacturing machine. In one embodiment, an initial state of the model for the second manufacturing machine is a current state of the model on the first machine. An adaptation and/or reset training period may then be initiated to adapt the model to the second machine.

Figure 5:
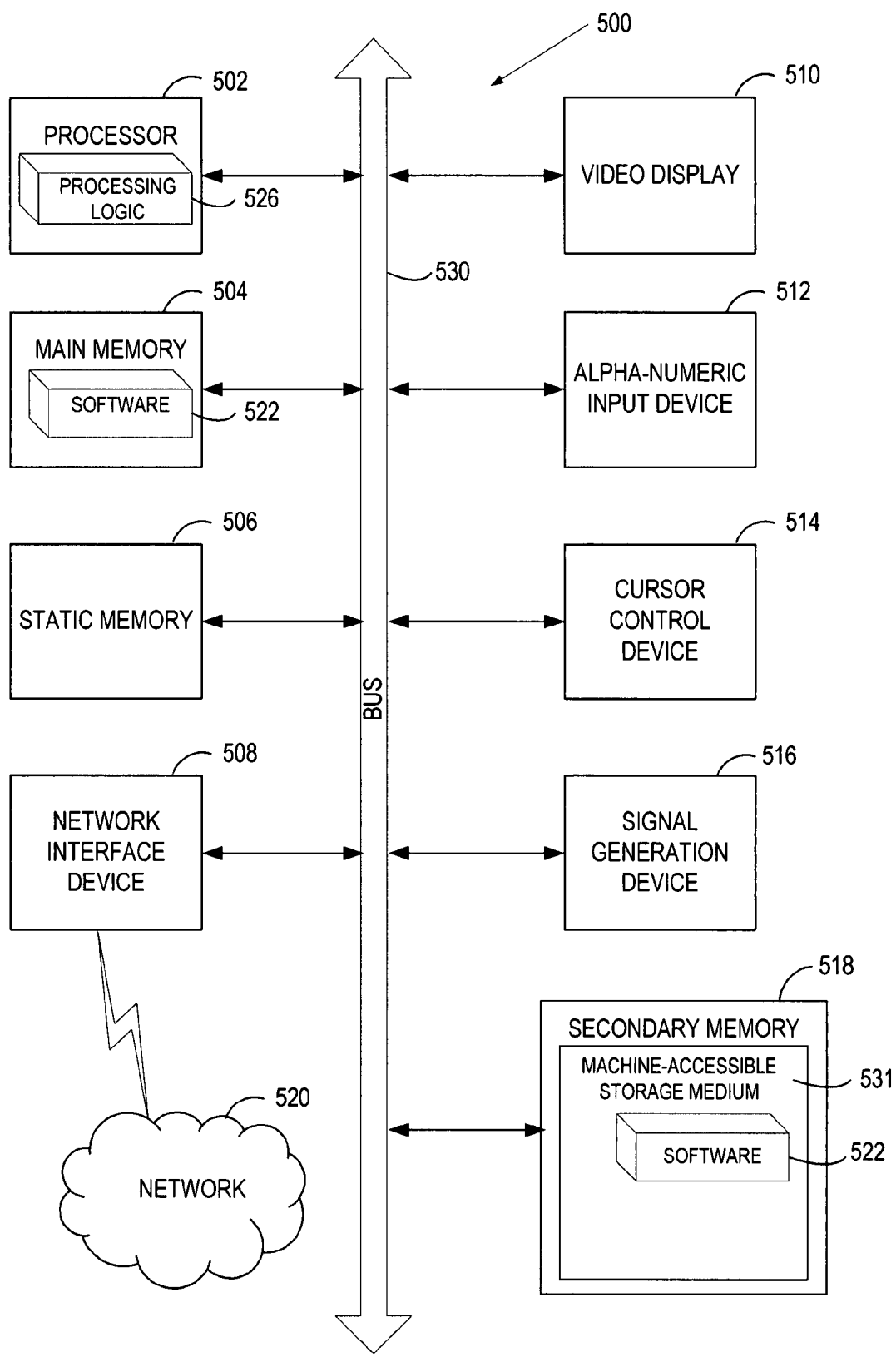
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of detecting faults, comprising:
   receiving, by a computing device, process data that includes a plurality of process variables;
   adapting one or more multivariate statistical models by the computing device according to the process data, wherein adapting includes applying a change to at least one univariate statistic of the one or more multivariate statistical models if the change is greater than a threshold value, wherein one or more statistics for a first subset of process variables from the plurality of process variables is adapted, and wherein one or more statistics for a second subset of process variables from the plurality of process variables is not adapted; and
   using the one or more adapted multivariate statistical models to analyze subsequent process data to detect faults.

2. The method of claim 1, further comprising:
   determining whether the process data indicates a fault for the one or more multivariate statistical models before adapting the one or more multivariate statistical models or after adapting the multivariate statistical models.

3. The method of claim 1, wherein the one or more multivariate statistical models are adapted according to a measured drift of one or more of the plurality of process variables.

4. The method of claim 1, wherein the one or more multivariate statistical models are adapted at predetermined intervals.

5. The method of claim 1, further comprising:
   determining whether the process data indicates a fault before adapting the one or more multivariate statistical models by applying a first fault detection algorithm; and
   determining whether the process data indicates a fault after adapting the one or more multivariate statistical models by applying a second fault detection algorithm, wherein control limits of the first fault detection algorithm are wider than control limits of the second fault detection algorithm.

6. The method of claim 1, wherein the one or more multivariate statistical models include at least a first model and a second model, the second model differing from the first model by at least one of an amount of historical data considered, process variables used, number of principal components used, confidence limits, a forgetting factor, a method of adapting to the measured drift, process variables adapted, training data used for model generation, and adaptation threshold values.

7. The method of claim 1, further comprising:
   automatically resetting at least one of the multivariate statistical models upon detecting machine maintenance on a tool associated with the process data.

8. The method of claim 7, wherein resetting comprises at least one of recalculating statistics for process variables having a fault contribution greater than a threshold value, adapting at least portions of a multivariate statistical model to new operating conditions, and restoring the multivariate statistical model to a state matching an original state that was generated upon completion of a training period.

9. The method of claim 7, wherein resetting comprises initiating a reset training period, wherein the reset training period is used to collect data to update at least one of the multivariate statistical models.

10. The method of claim 1, wherein adapting further includes applying a change to at least one of a correlation matrix, a number of principal components, loading vectors, mean, variance, covariance, principal component eigenvectors and principal component eigenvalues.

11. A machine-accessible storage medium including data that when accessed by a machine, cause the machine to perform a method comprising:
   receiving, by a computing device, process data that includes a plurality of process variables;
   adapting one or more multivariate statistical models by the computing device according to the process data, wherein adapting includes applying a change to at least one univariate statistic of the one or more multivariate statistical models if the change is greater than a threshold value, wherein one or more statistics for a first subset of process variables from the plurality of process variables is adapted, and wherein one or more statistics for a second subset of process variables from the plurality of process variables is not adapted; and
   using the one or more adapted multivariate statistical models to analyze subsequent process data to detect faults.

12. The machine-accessible storage medium of claim 11, the method further comprising:
   determining whether the process data indicates a fault for the one or more multivariate statistical models before adapting the one or more multivariate statistical models or after adapting the multivariate statistical models.

13. The machine-accessible storage medium of claim 11, wherein the one or more multivariate statistical models are adapted according to a measured drift of one or more of the plurality of process variables.

14. The machine-accessible storage medium of claim 11, wherein the one or more multivariate statistical models are adapted at predetermined intervals.

15. The machine-accessible storage medium of claim 11, the method further comprising:
   determining whether the process data indicates a fault before adapting the one or more multivariate statistical models by applying a first fault detection algorithm; and
   determining whether the process data indicates a fault after adapting the one or more multivariate statistical models by applying a second fault detection algorithm, wherein control limits of the first fault detection algorithm are wider than control limits of the second fault detection algorithm.

16. The machine-accessible storage medium of claim 11, wherein the one or more multivariate statistical models include at least a first model and a second model, the second model differing from the first model by at least one of an amount of historical data considered, process variables used, number of principal components used, confidence limits, a forgetting factor, a method of adapting to the measured drift, process variables adapted, training data used for model generation, and adaptation threshold values.

17. The machine-accessible storage medium of claim 11, the method further comprising:
   automatically resetting at least one of the multivariate statistical models upon detecting machine maintenance on a tool associated with the process data.

18. The machine-accessible storage medium of claim 17, wherein resetting comprises at least one of recalculating statistics for process variables having a fault contribution greater than a threshold value, adapting at least portions of a multivariate statistical model to new operating conditions, and restoring the multivariate statistical model to a state matching an original state that was generated upon completion of a training period.

19. The machine-accessible storage medium of claim 17, wherein resetting comprises initiating a reset training period, wherein the reset training period is used to collect data to update at least one of the multivariate statistical models.

20. The machine-accessible storage medium of claim 11, wherein adapting further includes applying a change to at least one of a correlation matrix, a number of principal components, loading vectors, mean, variance, covariance, principal component eigenvectors and principal component eigenvalues.

21. A statistical process monitoring system, comprising:
   a database to store one or more multivariate statistical models; and
   a computing device coupled with at least one manufacturing machine and coupled with the database, the computing device including a memory that stores instructions for a fault detector and a processor to execute the instructions, wherein the instructions cause the processor to:
      receive process data from the at least one manufacturing machine, the process data including a plurality of process variables,
      adapt at least one of the one or more multivariate statistical models, wherein adapting includes applying a change to at least one univariate statistic of the one or more multivariate statistical models if the change is greater than a threshold value, wherein one or more statistics for a first subset of process variables from the plurality of process variables is adapted, and wherein one or more statistics for a second subset of process variables from the plurality of process variables is not adapted, and
      use the one or more adapted multivariate statistical models to analyze subsequent process data to detect faults.

22. The statistical process monitoring system of claim 21, wherein the instructions further to cause the processor to determine whether the process data indicates a fault for the one or more multivariate statistical models before adapting the one or more multivariate statistical models or adapting the multivariate statistical models.

* * * * *